US012517793B2

(12) United States Patent
Madan et al.

(10) Patent No.: US 12,517,793 B2
(45) Date of Patent: Jan. 6, 2026

(54) INDICATING PREFERRED RESTORE THROUGHPUT IN A DEDUPLICATION FILESYSTEM VIA A REST INTERFACE

(71) Applicant: Dell Products L.P., Round Rock, TX (US)

(72) Inventors: Nitin Madan, San Jose, CA (US); Kedar Godbole, Pune (IN); Aditi Tejas Gosavi, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/622,620

(22) Filed: Mar. 29, 2024

(65) Prior Publication Data

US 2025/0307086 A1 Oct. 2, 2025

(51) Int. Cl.
*G06F 11/14* (2006.01)

(52) U.S. Cl.
CPC ...... *G06F 11/1469* (2013.01); *G06F 11/1453* (2013.01); *G06F 11/1464* (2013.01)

(58) Field of Classification Search
CPC ............. G06F 11/1469; G06F 11/1453; G06F 11/1464
USPC ........................................................... 714/6.3
See application file for complete search history.

(56) References Cited

U.S. PATENT DOCUMENTS

2022/0113780 A1* 4/2022 York ..................... G06F 1/3237

* cited by examiner

*Primary Examiner* — Yair Leibovich
(74) *Attorney, Agent, or Firm* — Staniford Tomita LLP

(57) ABSTRACT

A count of multi-stream restore (MSR) streams associated with restore jobs pinned for the MSR streams and a count of MSR streams associated with restore jobs not pinned for the MSR streams are tracked. Each MSR stream includes multiple internal threads that prefetch data for the restore jobs into read-ahead caches. A REST request is received for a restore job, the REST request requesting that the restore job be pinned for an MSR stream. When the count of MSR streams associated with restore jobs pinned for the MSR streams plus the count of MSR streams associated with restore jobs not pinned for MSR streams has reached a threshold, an MSR stream associated with a restore job not pinned for the MSR stream is torn down.

18 Claims, 14 Drawing Sheets

INDICATING PREFERRED RESTORE THROUGHPUT IN A DEDUPLICATION FILESYSTEM VIA A REST INTERFACE

CROSS-REFERENCE TO RELATED APPLICATIONS

The present application is related to U.S. patent application Ser. No. 18/622,538, filed Mar. 29, 2024), which is assigned to the assignee of the present application, and is incorporated herein by reference in its entirety.

TECHNICAL FIELD

The present invention relates generally to information processing systems, and more particularly to large scale filesystems.

BACKGROUND

Backups of client files to a backup system may be conducted at periodic intervals. The backup copies can serve a number of different purposes such as data protection, testing and development, reporting, data mining, and so forth. A backup copy may be restored from the backup system to a client. It may be the case, however, that different files undergoing restoration have different priorities. There is a need for improved systems and techniques to identify certain restorations as high priority so that they can be completed in the shortest amount of time given the available resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A deduplication filesystem offers multiple mechanisms for restoring a file. In an embodiment, a mechanism referred to as multi-stream restore (MSR) includes the establishment of multiple internal threads that prefetch data of a file to restore into a read-ahead cache. A client can indicate whether a restoration should be designated as MSR. When the client makes the indication of MSR, the filesystem attempts to fulfill the request.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
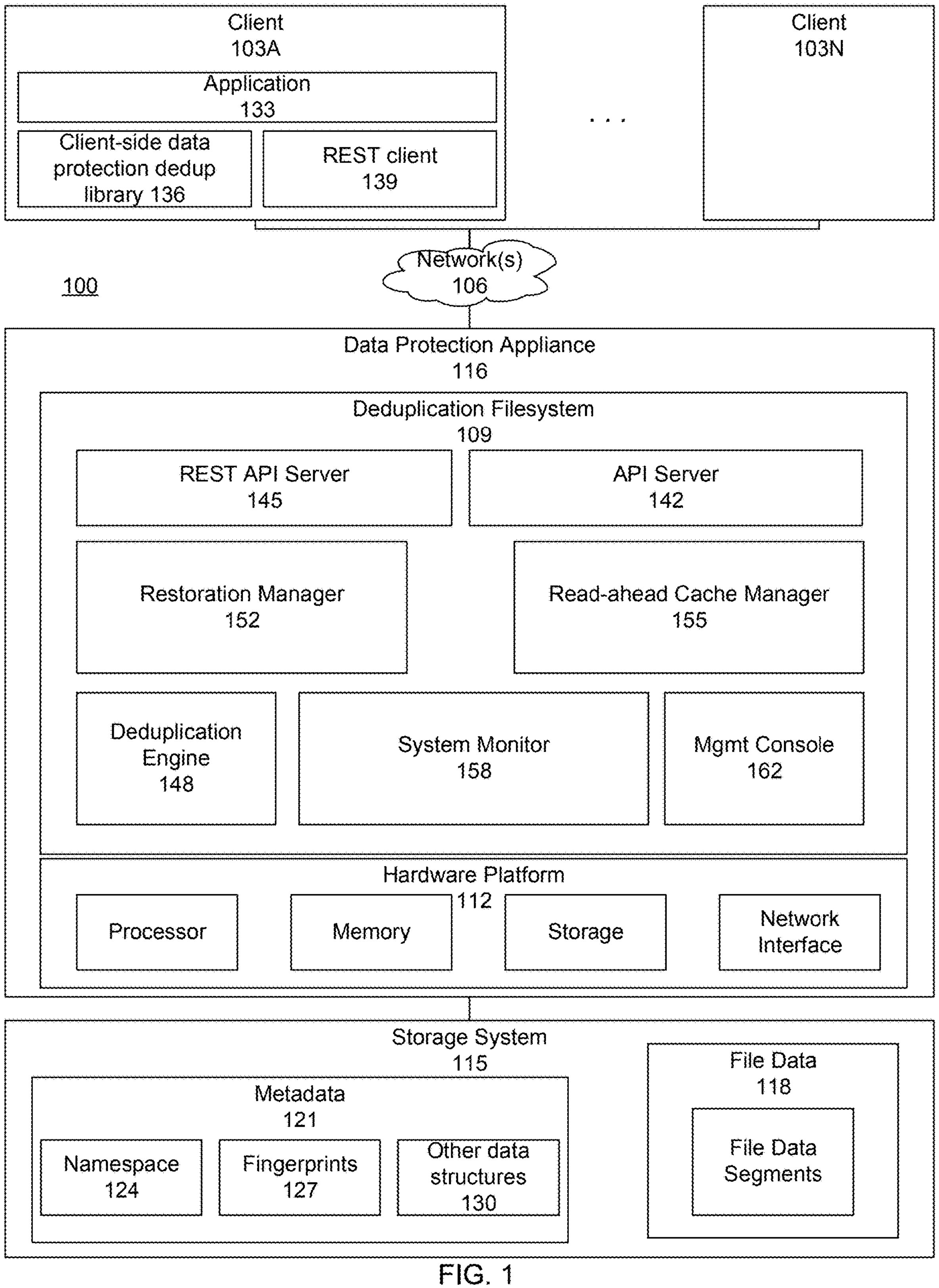
FIG. 1 shows a block diagram of an information processing system for a client-informed restore, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a block diagram of an information processing system 100 within which methods and systems for allowing clients to indicate preferred throughputs for restoration of files stored in a deduplication filesystem may be implemented. In an embodiment, the filesystem offers multiple options, mechanisms, or techniques for restoring a file. In this embodiment, there is a mechanism that may be referred to as multi-stream restore (MSR). An MSR stream includes the establishment or opening of multiple (e.g., two or more) internal threads that prefetch data of a file to restore from a storage system and into a cache of the filesystem. In other words, the data is placed into the cache before a client request for the data is made. The multiple internal threads operate in parallel or concurrently to read different portions or chunks of the file and write them to the cache. Thus, with MSR, a single external read request from a client application may result in the filesystem opening multiple internal streams, threads, or IO pipelines working in parallel to read and fetch the data rather than a single internal read thread or stream responding to the read request.

The cache may be referred to as a read-ahead cache. The read-ahead cache may be an in-memory data structure. Subsequent read requests for the file from the client can be served from the read-ahead cache rather than having to then access the storage system and fetch the data. Using an MSR stream can reduce the time required to restore a file especially for large files when the file read access pattern is sequential as compared to using a non-MSR stream. Sequential access refers to accessing data elements one after another, in a linear sequence, or without random jumps. In a non-MSR stream there may be only a single internal read thread where reads are serialized.

Compute resources, however, are finite or limited. Restoring a file using an MSR stream can consume a greater amount of resources as compared to using a non-MSR stream and negatively impact the overall performance of the filesystem. For example, other filesystem operations and processes, such as file ingest, may be starved of resources when there is an excessive number of file restorations using MSR streams. In an embodiment, a client (via a backup administrator user) can specify whether or not a file to restore should be pinned, flagged, or otherwise indicated as a high priority restoration job in which an MSR stream is preferred. The filesystem, upon receiving the job restoration request identifying the file as priority, attempts to fulfill the request using an MSR stream.

In an embodiment, the number of MSR streams allowed is limited to a predetermined threshold number so as to not overload the system. MSR streaming can be employed opportunistically. Thus, an MSR stream may be used to conduct a restoration job of a file even if the client did not specifically request the MSR stream, so long as the number of MSR streams remains below the threshold. When, however, a restoration job is received that specifically indicates the file to be restored is high priority or otherwise specifically requests an MSR stream, but the threshold number of MSR streams has already been reached, the filesystem determines whether there exists a current MSR stream corresponding to a restoration of another file that can be evicted from MSR status (e.g., torn down) in order to open up an MSR slot. The current MSR stream corresponding to the other file may be evicted or torn down when the associated client did not specifically request MSR or otherwise indicate the restoration as being a priority. While clients can indicate their preferred restoration throughput, the ultimate decision on whether to grant MSR status resides with the filesystem. In determining whether to grant MSR status, the filesystem monitors and tracks system load in addition to evaluating a set of criteria to determine eligibility for MSR. Such criteria may include file size, access pattern, other criteria, or combinations of these.

The example shown in FIG. 1 includes a set of clients 103A-N connected via a network 106 to a deduplication filesystem 109. The deduplication filesystem is supported by an underlying hardware platform 112 and is connected to a storage system 115. The filesystem may be incorporated into a data protection appliance 116. The filesystem may be distributed across multiple nodes of a cluster. The nodes may be physical or virtual nodes.

The storage system stores backups of client files 118 along with metadata 121 to facilitate organization, deduplication, security, recovery, performance, and access. Metadata may include a namespace 124, fingerprints 127, and other data structures 130. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

A client may include applications 133 and files that are to be backed up to the deduplicated filesystem. The applications may include a backup application. In an embodiment, the client includes a client-side data protection deduplication library 136, a Representational State Transfer (REST) client 139, or both.

The filesystem may include an application programming interface (API) server 142 that handles requests from the client-side deduplication library, a REST server (e.g., RESTful API) 145 that handles REST requests from the REST client, or both. The filesystem may further include a deduplication engine 148, restoration manager 152, read-ahead cache manager 155, system monitor 158, and management console 162. It should be appreciated that the blocks shown in FIG. 1 and other figures may be functional and there can be many different hardware and software configurations to implement the functions described.

The filesystem provides a way to organize data stored in the storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. The namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

The deduplication engine, in conjunction with the client-side deduplication library, is responsible for processing and backing up client files to the backup storage system. The processing of backup operations may be referred to as file ingest. The restoration manager is responsible for handling job requests from the clients to restore files back to the clients. The read-ahead cache manager manages access to data to restore that has been placed into the read-ahead cache. The system monitor is responsible for monitoring system load. System load may include, for example, a measurement of the amount of computational work being performed, the number of processes or threads active at a given time, and the like.

The management console provides a user interface to the filesystem. The interface may be a graphical user interface (GUI), shell, or command line. The interface may be a programmatic interface such as an application programming interface (API). A user, such as an administrative user, can use the management console to administer, configure, and manage the system. The UI may provide, for example, a listing of files being restored, identifications of the clients that requested the file restores, whether an MSR stream is being used to restore a particular file, current number of MSR streams, whether MSR was specifically requested, estimated time remaining to complete the restoration of a file, number of bytes of a file remaining to restore, number of bytes of the file already restored, and so forth. Table A below shows an example of information that may be displayed via the management console.

TABLE A

| File | Client | MSR Enabled | MSR Requested |
|---|---|---|---|
| File A | Client A | Yes | Yes |
| File B | Client B | Yes | No |
| File C | Client C | Yes | Yes |
| File D | Client A | Yes | Yes |

As shown in the example of Table A above, currently there are four files being restored. Restoration of files A and D were requested by client A. Restoration of file B was requested by client B. Restoration of file C was requested by client C. MSR is enabled for each file. Clients A, C, and D have specifically requested MSR for the restore. Client B has not made a specific request for using MSR for the restoration of file B.

In brief, a client application, such as a backup application, interfaces with the client-side deduplication library to perform backups of the files. The client-side deduplication library, in turn, communicates with the deduplication engine at the data protection appliance to backup the files, in a deduplicated manner, to the backup storage system.

In an embodiment, the client-side deduplication library in conjunction with the deduplication filesystem provides for a deduplicated backup protocol that may be referred to as distributed segment processing (DSP) or client-side deduplication. A specific example of the deduplicated backup protocol and deduplicated filesystem is Data Domain Boost (DDBoost) and Data Domain Filesystem (DDFS), respectively, as provided by Dell EMC of Hopkinton, Massachusetts and Round Rock, Texas. While some embodiments are described in conjunction with the DDBoost protocol and DDFS it should be appreciated that aspects and principles described herein can be applied to other similar protocols and filesystems that may be referred to by other names. Conducting backups using DSP allows for reducing network bandwidth and compute resources as compared to other traditional protocols for transmitting and accessing files over a network such as Network File System (NFS) and Common Internet File System (CIFS).

In an embodiment, during a backup or other filesystem operation request, an application on a client calls the client-side deduplication library application programming interfaces (APIs) which, in turn, issue remote procedure (RPC) calls to the deduplicated filesystem. Client-side library code cooperates with server-side code to perform distributed deduplication of user data to reduce the data that is actually sent to the server and to reduce the physical storage required to store the data.

Similarly, when a file is to be restored from backup storage to the client, the client application can again call the client-side deduplication library which, in turn, calls the filesystem and identifies the file to restore along with specifying options for the restore.

In an embodiment, the deduplicated filesystem may instead or additionally expose a RESTful endpoint that allows client applications to access filesystem services and to perform operations on resources via Hypertext Transfer Protocol (HTTP) and methods (e.g., GET, POST, PUT, and DELETE). This allows communication between the deduplicated filesystem and a client application without having to rely on the client-side deduplication library. Requests to restore files can bypass the client-side deduplication library.

Figure 2:
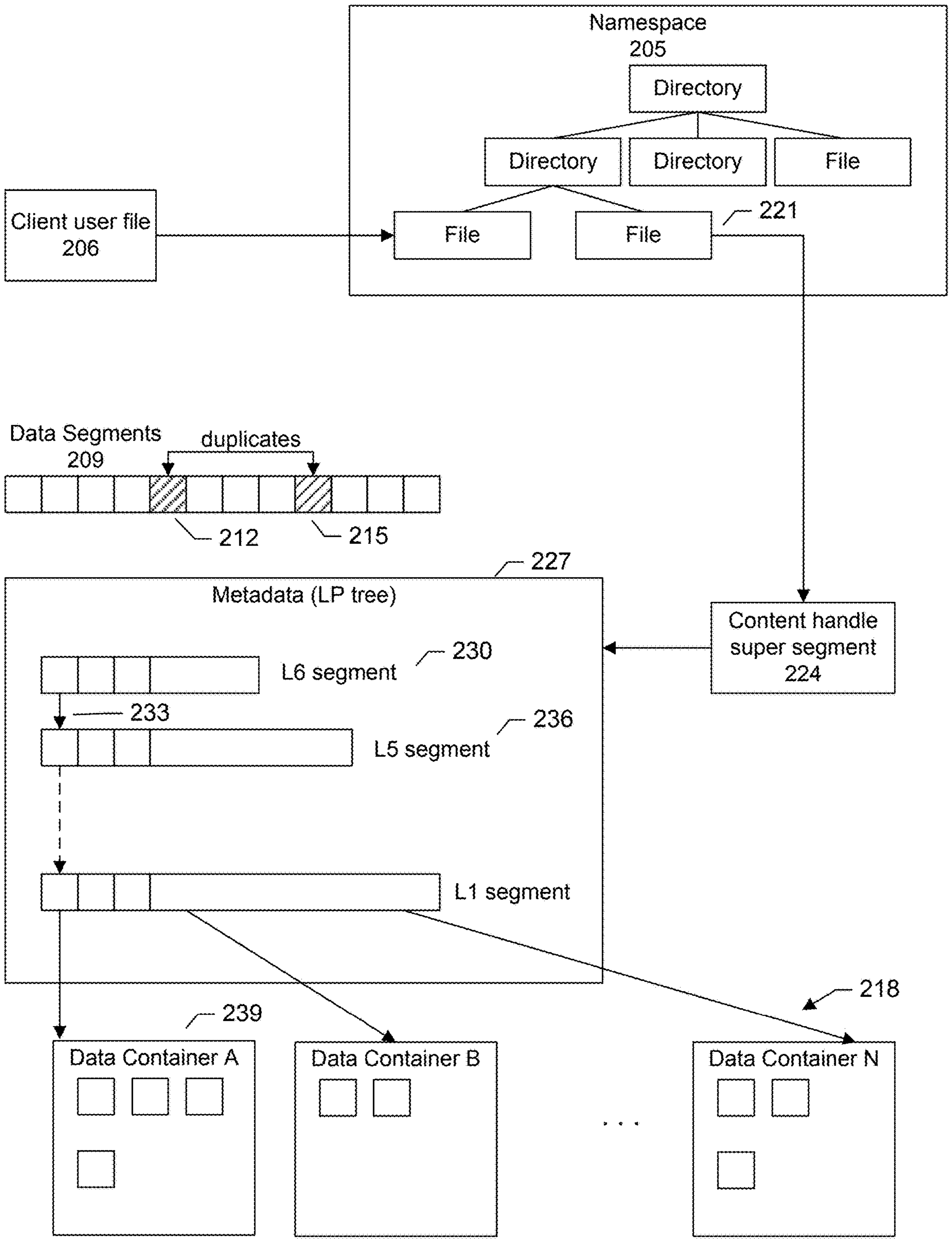
FIG. 2 shows an example of a deduplication process, according to one or more embodiments.

FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. In an embodiment, different nodes of a cluster are responsible for different portions of the namespace and a node may perform deduplication within its assigned portion of the namespace. Further details of a filesystem namespace are provided in FIG. 3 and the discussion accompanying FIG. 3.

As data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content or file handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
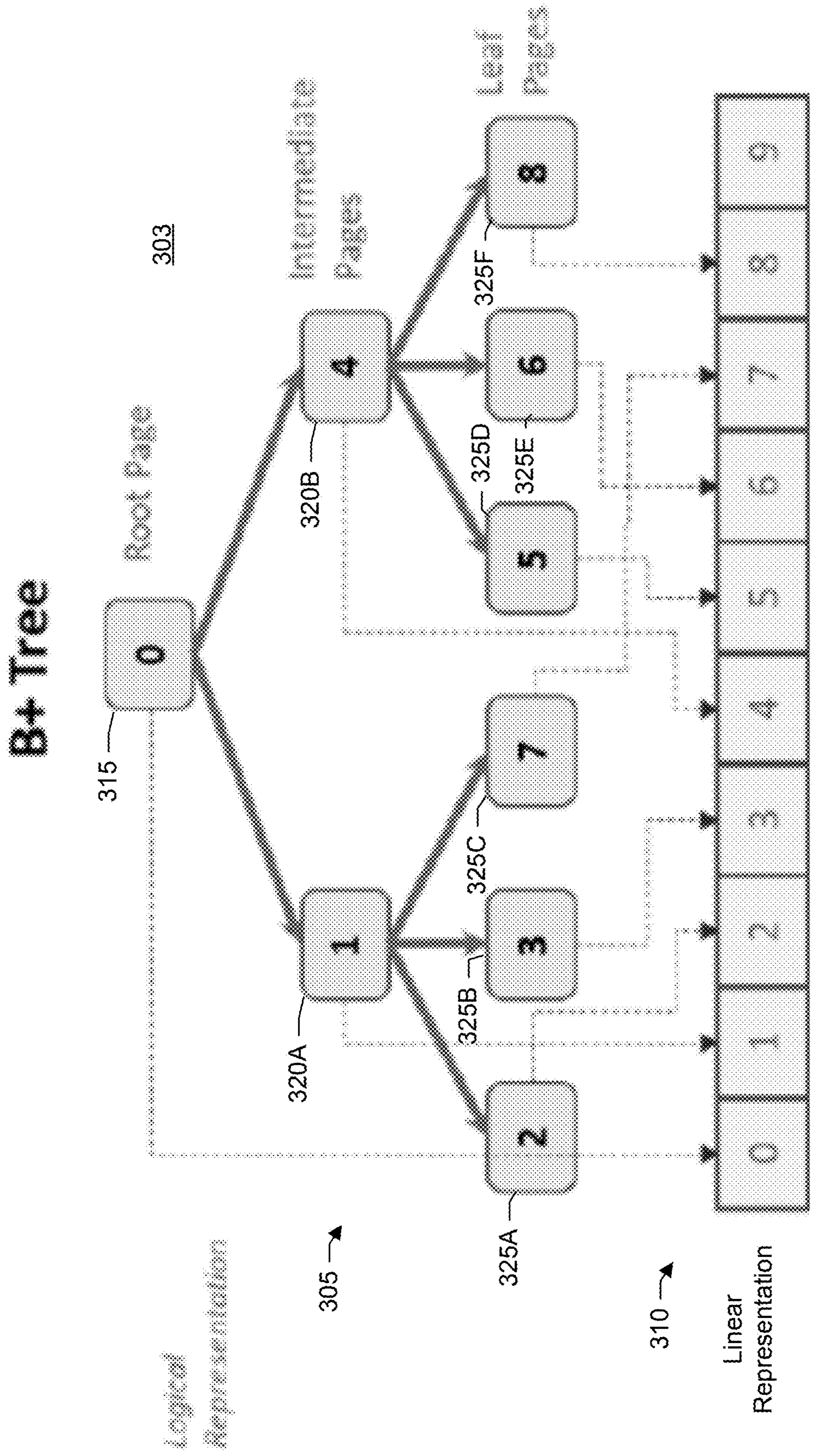
FIG. 3 shows an example of a tree data structure of the namespace, according to one or more embodiments.

FIG. 3 shows further detail of a namespace of the filesystem according to one or more embodiments. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

Figure 4:
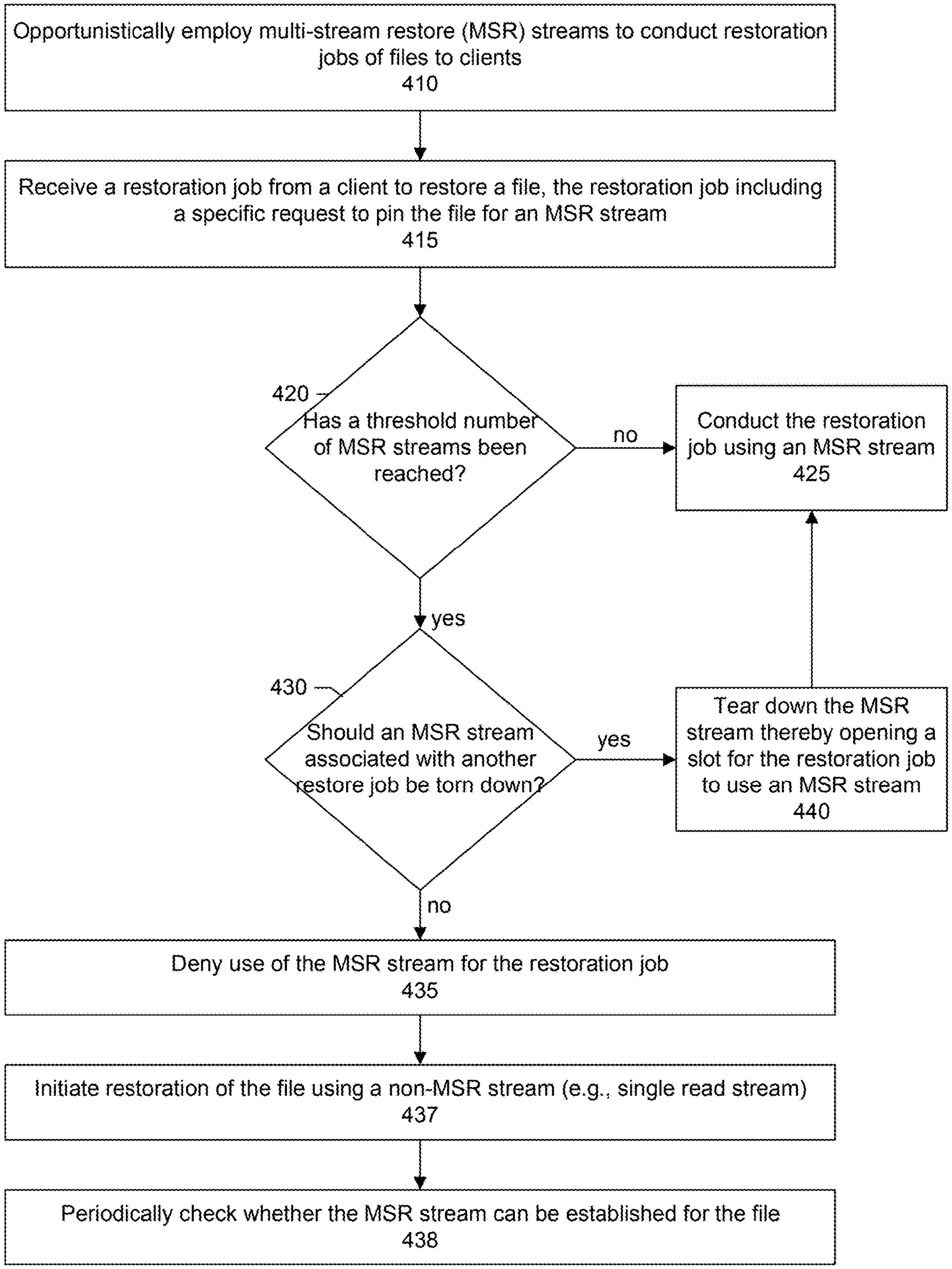
FIG. 4 shows an overall flow for client-informed restore, according to one or more embodiments.

FIG. 4 shows an overall flow for a client-informed multi-stream restore. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 410, multi-stream restore (MSR) streams are opportunistically employed to conduct restoration jobs of files to clients. In particular, MSR may be enabled for files being restored based on evaluating a set of criteria or factors. Such criteria or factors may include whether a file meets a minimum threshold size, a determination that the file read access pattern is sequential, current system load being below a threshold level, other factor, criteria, or combinations of these.

For example, establishing an MSR stream can be time and resource intensive. For relatively small files, e.g., files less than 10 gigabytes (GB), the time and resources required to establish an MSR stream may not be advantageous. Thus, there can be a configurable rule or policy requiring that a file be of a minimum threshold size in order for MSR to be enabled. As another example, the benefits of an MSR stream are better realized when the data access pattern is sequential rather than random. Thus, there can be another configurable rule or policy requiring that the reads associated with a restoration stream be sequential.

In an embodiment, a restore job or restore stream associated with a file can dynamically switch between an MSR stream and a non-MSR stream. The filesystem, restore jobs, or restore streams may include logic to periodically check, based on the MSR criteria, whether MSR should be enabled (if disabled) or disabled (if enabled). For example, restoration of a file may initially be conducted using an MSR stream. During restoration of a file, however, resource availability of the filesystem may change such that continued use of the MSR stream may cause an overconsumption of resources resulting in a degradation of overall filesystem performance. In such a case, the MSR stream may be torn down and replaced with a single read stream. The restoration of the file may then continue with the single read stream.

As another example, restoration of a file may initially be conducted using a non-MSR stream (e.g., single read stream). During restoration of the file, however, resource availability of the filesystem may change such that resources not previously available are now available. In this case, the non-MSR stream may be replaced with an MSR stream. The restoration of the file may then continue with the MSR stream. In an embodiment, system load checks are configured to occur every second. It should be appreciated, however, that system load checks can be configured to occur at any time interval or frequency as desired.

In an embodiment, the MSR jobs are designed to be "good citizens" in that each on-going MSR job periodically checks with the system load monitor. If a particular MSR job, during a particular system load check, happens to discover that a threshold load has been reached, the particular MSR job can itself trigger a tear-down so as to help relieve pressure on the system. This self-check/tear-down logic helps to ensure that filesystem resources remain balanced or available for other filesystem services and operations. Thus, load on the system can be automatically stepped down as each next or current MSR stream tears itself down in response to a respective system load check until system load is brought to below the threshold level. Similarly, during periods of low system load, the system load can be progressively stepped up as MSR is enabled for on-going file restorations until the threshold level is reached. Thus, a file restoration stream may flip or transition between an MSR and non-MSR stream throughout the restoration process of the file. During periods of high system load, an MSR stream may be torn down. During periods of low system load, the MSR stream may be reestablished.

In a step 415, a restoration job from a client to restore a file is received. The restoration job includes a specific request to pin the file for an MSR stream. The restoration job or restore stream associated with the restoration may be tagged with a tag, flag, or other indication or mark indicating that MSR or MSR status was requested, e.g., "MSR requested." The tag may be referred to as a priority tag. The tag is an indication to the filesystem to give the associated file preferential treatment during the restoration.

In an embodiment, the request to restore the file and whether MSR is preferred is communicated to the filesystem via the client-side deduplication library. In another embodiment, the request is communicated via a REST protocol.

In a step 420, a determination or check is made as to whether a threshold number of MSR streams has already been reached. If not, in a step 425, the restoration job is conducted using an MSR stream. That is, multiple (e.g., two or more) internal read-ahead streams are opened or established for the restoration job where each internal read-ahead stream aggressively reads, in parallel, data into a read-ahead cache. Multiple IO pipelines are opened to feed into the read-ahead cache.

If, however, the threshold number of MSR streams has been reached, the request is not yet denied. Rather, in a step 430, a determination is made as to whether an MSR stream associated with another current or in-progress restore job should be torn down. The MSR stream may be torn down if an MSR stream was not specifically requested. If so, in a step 440, the MSR stream is torn down thereby opening an MSR slot for the restoration job in which MSR was specifically requested.

As discussed, in an embodiment, MSR for restorations of files is enabled opportunistically. That is, if a particular file undergoing a restoration qualifies for MSR based on current system load and other criteria, MSR may be enabled regardless of whether or not an MSR stream was specifically requested for the restoration. The filesystem tracks a count of MSR streams corresponding to restoration jobs in which MSR was specifically requested and a count of MSR streams corresponding to restoration jobs in which MSR was not specifically requested (but are nonetheless being conducted using MSR streams). If a sum or total of these counts reaches the threshold number of MSR streams allowed and a new restoration job is received that includes a specific request for MSR, a current or existing restoration job using an MSR stream may be torn down so that an MSR stream can be opened for the newly received restoration job in which the MSR stream was specifically requested.

If, however, all MSR streams associated with the current or in-progress restore jobs were specifically requested, in a step 435, the use an MSR stream to conduct the restoration job is denied. In a step 437, the restoration of the file is then initiated using a non-MSR stream, e.g., single read stream.

In a step 438, however, periodic checks are made during the restoration as to whether MSR can be enabled. In particular, the "MSR requested" tag may remain attached to the restore job or restore stream associated with the restoration so that should another restore job using an MSR stream completes or an MSR slot otherwise opens up, an MSR stream can be established for the restoration job. For example, in an embodiment, the administrator user may decide, while restoration of a file is in progress, that an MSR stream for the file is no longer needed. In such a case, a request may be issued from the client to the filesystem to revoke or "unpin" the file from MSR status. The filesystem, upon receipt of the request, tears down the MSR stream thereby creating an opening for an MSR stream that can be used by another file associated with another restoration job. The ability to pin and unpin jobs provides the administrator with a high degree of flexibility in prioritizing file restorations regardless of when the requests for restorations are made.

Consider, as an example, that the filesystem is provisioned to handle 8 MSR jobs and there are 8 current restoration jobs. In this case, all 8 restoration jobs may be given MSR status despite none of the 8 jobs being a pinned job in which an MSR stream was specifically requested. Subsequently, while the restoration jobs are in progress, a 9th restoration job is received in which the administrator user has pinned the job for MSR status. This then causes a bump or eviction of at least one of the 8 on-going restoration jobs from MSR status so that an MSR stream can be opened for the newly received 9th job in which MSR was specifically requested.

In an embodiment, the administrator user can rank any number of on-going file restorations according to priority. In this embodiment, the filesystem prioritizes use of MSR streams for files having a high priority ranking over files having a low priority ranking, regardless of when the request to restore a file was received. Files indicated by the administrator as having a low restore priority may be evicted from MSR status to make room for files having a high restore priority.

Figure 5:
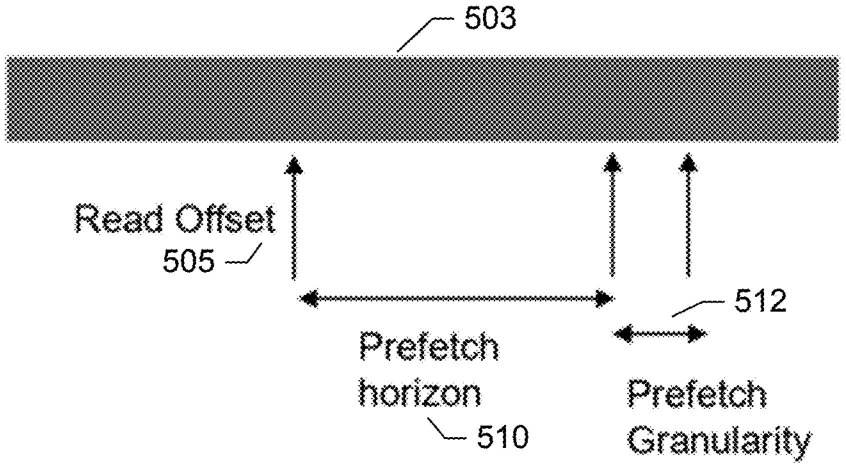
FIG. 5 shows an example of prefetching, according to one or more embodiments.

FIG. 5 shows a block diagram of a prefetching technique. In an embodiment, the filesystem includes a read-ahead (prefetching) system built in. This is a hint to get the sequential I/O prefetched into the read-ahead cache, before the application read I/O is requested. In an embodiment, the filesystem includes a sophisticated multi-streamed prefetching mechanism which gives a certain number of restores a "multi-streamed" advantage.

Specifically, multiple internal threads prefetch data into a read-ahead cache, and the application read requests are served from this cache. The internal read threads keep the cache populated with data before the corresponding application read request arrives, thus enabling a faster response to the application read requests.

In an embodiment, the MSR benefit is conferred to restore streams opened by an application in a First-Come-First-Serve (FCFS) manner, i.e., the initial restore streams that are opened will gain the benefit, but later streams do not get any benefit once the maximum limit is crossed. If more streams are opened and a system load threshold is hit, MSR tears down and the initial set of MSR-enabled streams loses the benefit due to system load.

In another embodiment, MSR is application-aware and, more specifically, supports application-specified priority for a given restore. The application may choose to prioritize one or more restores out of a set of concurrent restores, with the expectation that the prioritized restores are operating at a higher performance or restore throughput. Further, as restores complete and the situation changes, the application may wish to subsequently increase or decrease the priority of restores at run-time.

In an embodiment, a method may include: receiving a first request to restore a first file, the first request including a request to pin the first file for a multi-stream restore (MSR) stream; upon determining that the MSR stream for the first file can be granted, establishing a plurality of internal threads that prefetch data of the first file into a first read-ahead cache; while the restoration of the first file is in-progress, receiving a second request including a request to unpin the first file from the MSR stream; in response to the second request, tearing down the MSR stream being used to restore the first file; and replacing the MSR stream with a non-MSR stream, the non-MSR stream having a single internal thread that reads the data of the first file upon request for the data.

In another embodiment, a method may include: receiving a first request to restore a first file, the first request not including a request to pin the first file for a multi-stream restore (MSR) stream; establishing a single internal read thread to read data of the first file to restore; while restoration of the first file is in-progress, receiving a second request including a request to pin the first file for the MSR stream; and upon determining that the MSR stream for the first file can be granted, establishing a plurality of internal threads that prefetch data of the first file into a first read-ahead cache.

As discussed, in an embodiment, the restores managed by the filesystem are aided by a read-ahead (or prefetch) mechanism. A form of prefetching includes a read hint issued at a certain horizon (distance) from the read offset. A single read request may issue a single prefetch request, at an offset calculated from the read offset and prefetch horizon.

As shown in the example of FIG. 5, there is a chunk 503. If the read comes in at an offset 0 megabytes (MB) 505, the prefetch request is issued at (0+prefetch horizon 510) MB. The prefetch horizon may be a few megabytes. It can be configured higher in the scenarios where the underlying storage layer is slower.

For example, consider that the chunk has a range of 32 MB, and a read increment 512 (also referred to as a prefetch increment) has a granularity size of 1 MB. In the example shown in FIG. 5, the read increment may begin at a point within the chunk at the prefetch horizon (a parameter of the filesystem), as e.g., at 24 MB, measured within the chunk from the end of a read offset that is measured from a starting position of the chunk. The prefetch horizon specifies how far from the read offset the prefetch increment begins. Once an internal read thread has completed reading its chunk, the internal read thread may move to a next designated chunk, which may or may not be the next contiguous section of the file to be read.

This mechanism boosts read performance significantly since the application read requests mostly find all their data already present in the read-ahead cache, and therefore need not block for IO.

Since the reads are copying data out from memory (which is quite fast) while the prefetches are doing the actual work of reading from the storage layer (which is relatively slower), reads keep catching up with the prefetches periodically. Such a read request blocks until the data becomes available, but during this time, the prefetches that have been issued out already by the previous reads get time to perform their IO and load data into memory. This ensures that the subsequent read requests do not block, until a read catches up with a prefetch again. This cycle continues throughout the restore of a file. Since most of the reads are getting served out of memory, throughput improvement is significant.

As discussed above, the prefetches are operating at the prefetch horizon, and they bring the data into memory, just as application reads are catching up. However, the application reads may catch up often enough—this is usually because the disk IO is slow, and because, as the age of the file increases, the locality of the file goes bad. This is especially true for deduplicating filesystems.

Figure 6:
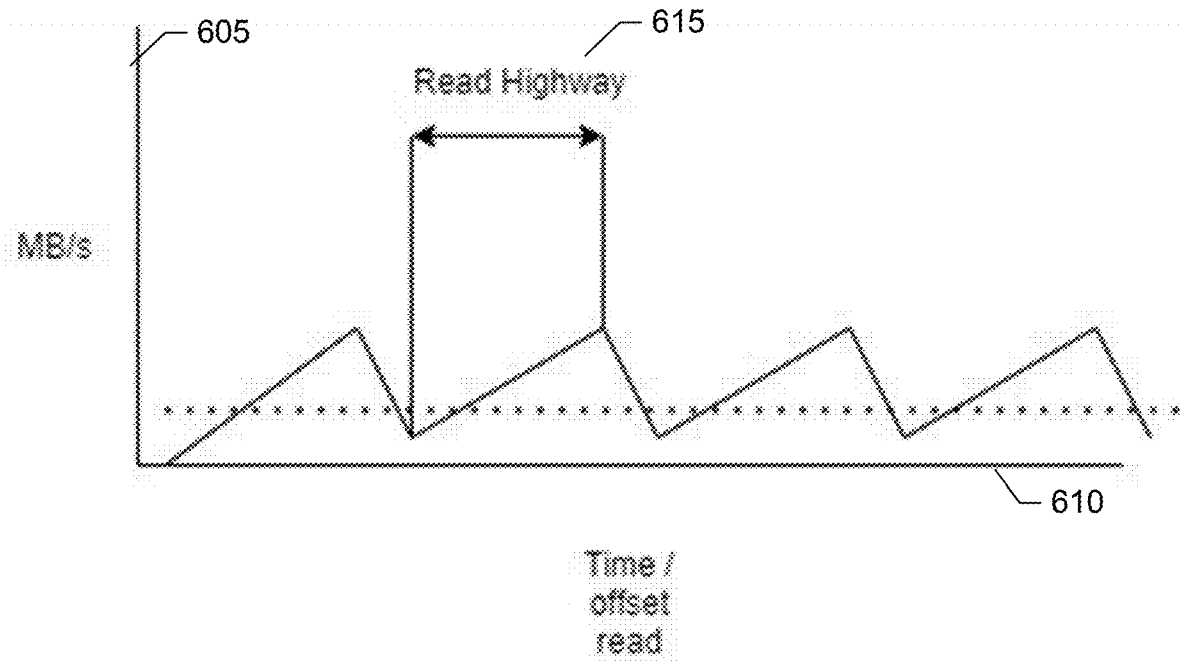
FIG. 6 shows a graph of a read highway, according to one or more embodiments.

FIG. 6 shows a graph representing read throughput 605 versus time 610. Sections of the graph identify reads being satisfied from memory (fast reads) and reads blocking on IO from storage (slow reads). Since reads keep catching up with prefetches, the average read performance (dotted line) is a fraction of the peak read performance.

The distance between the time spent between the stalls may be defined as a read highway 615. The restore performance is directly proportional to the length of the read highway.

Figure 7:
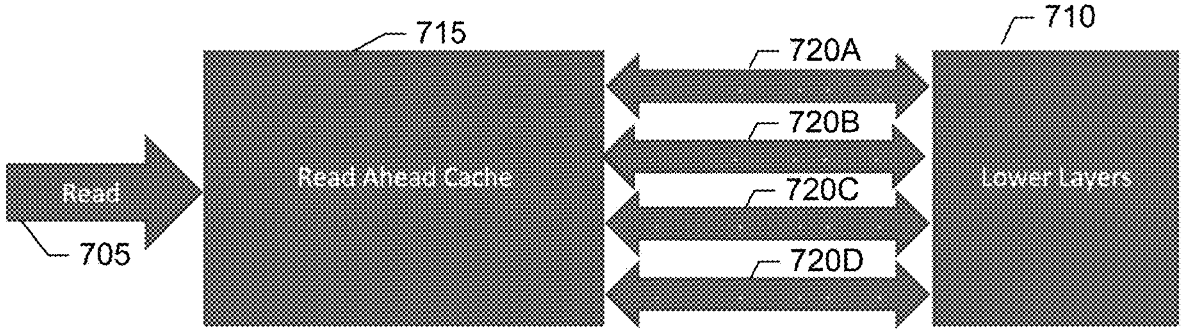
FIG. 7 shows a block diagram of a read-ahead cache, according to one or more embodiments.

FIG. 7 shows a block diagram of a multi-stream read-ahead cache. In an embodiment, multiple internal read streams are used to serve the prefetches. This technique of using multiple internal read streams may be referred to as multi-stream restore (MSR). U.S. Pat. Nos. 11,150,826 and 11,644,993 provide a detailed discussion of MSR. Both patents are assigned to the present assignee and are incorporated by reference herein, along with all other references cited, for all purposes. Multi-streamed restores allow parallel restores, when the system has enough or sufficient resources available. In the example shown in FIG. 7, there is an external read request 705, such as from a client application, to access file data stored in lower storage layers 710 above which the filesystem resides. The filesystem maintains a read-ahead cache 715.

The read-ahead cache is filled in by multiple concurrent internal read threads 720A-D. Each thread reads a section of the file which is referred to as a chunk. In the example shown in FIG. 7, there are 4 internal threads, and each thread is operating on a 64 MB chunk to fill up the read-ahead cache. The number of internal threads may vary dynamically depending on factors such as operating conditions, heuristically predetermined rules and criteria that control the number of internal threads to establish, other factors, or combinations of these. For example, the number of internal read threads per external read request may be greater than 4 (e.g., 5 internal threads) or less than 4 (e.g., 3 internal threads). The external reads (e.g., reads requested from the clients) are serviced off the read-ahead cache. In an embodiment, the read-ahead cache is a per file cache. For example, a first file being restored may be associated with a first read-ahead cache. A second file being restored may be associated with a second read-ahead cache, different from the first read-ahead cache.

Figure 8:
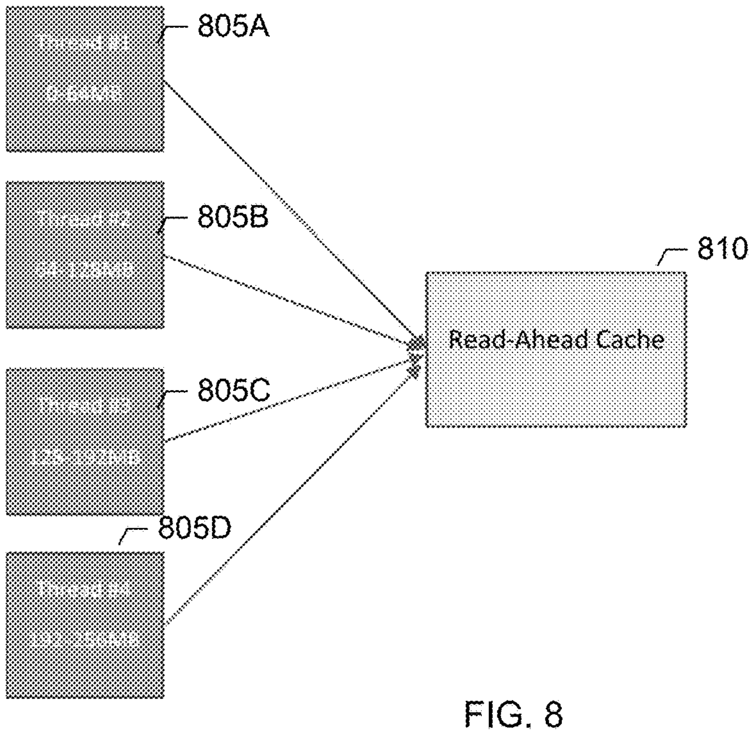
FIG. 8 shows another block diagram of a read-ahead cache, according to one or more embodiments.

FIG. 8 shows another block diagram of internal threads 805A-D populating a read-ahead cache 810. The example shown in FIG. 8 includes a 64 MB sized chunk. The chunk is a subsection of the window of offsets for a file. Once the internal thread has read its chunk, it moves on to the next designated chunk, which may not be the next contiguous section of the file to be read.

Figure 9:
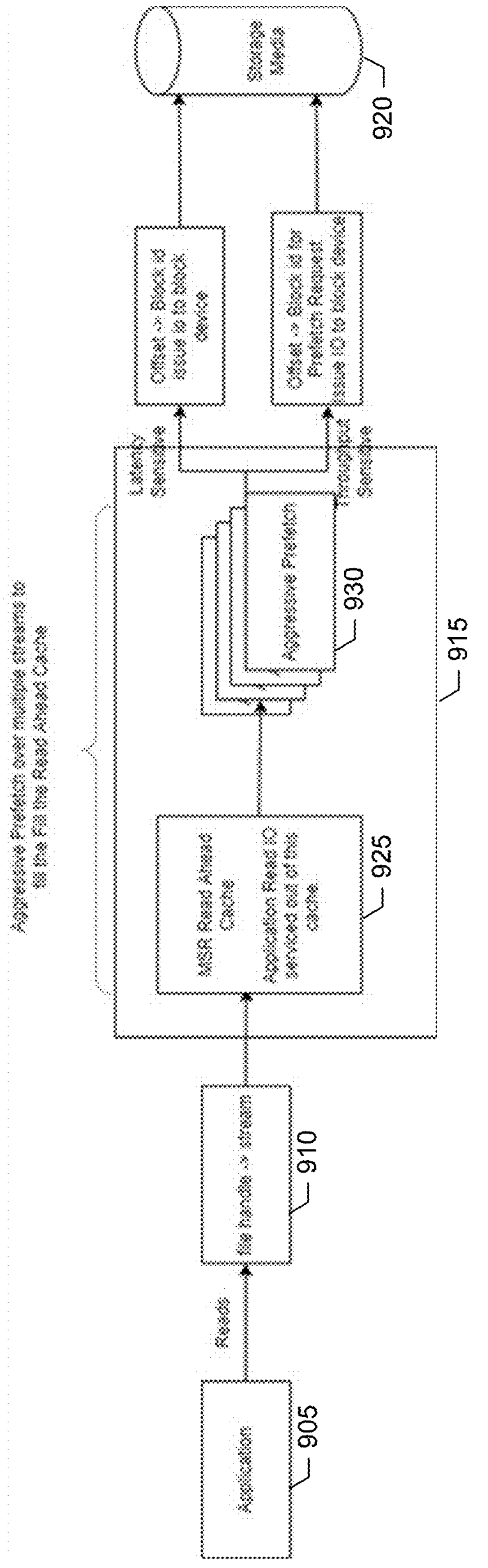
FIG. 9 shows a flow for MSR, according to one or more embodiments.

FIG. 9 shows a block diagram of an overall MSR flow. As shown in the example of FIG. 9, an application 905 issues a read request 910 identifying a file (e.g., via a file handle or file inode) to be read to a filesystem 915. The filesystem resides above storage media 920 where data of the file is persisted. The filesystem maintains a read-ahead cache 925. The filesystem can conduct an aggressive prefetch 930 over multiple streams to fill the read-ahead cache.

Figure 10:
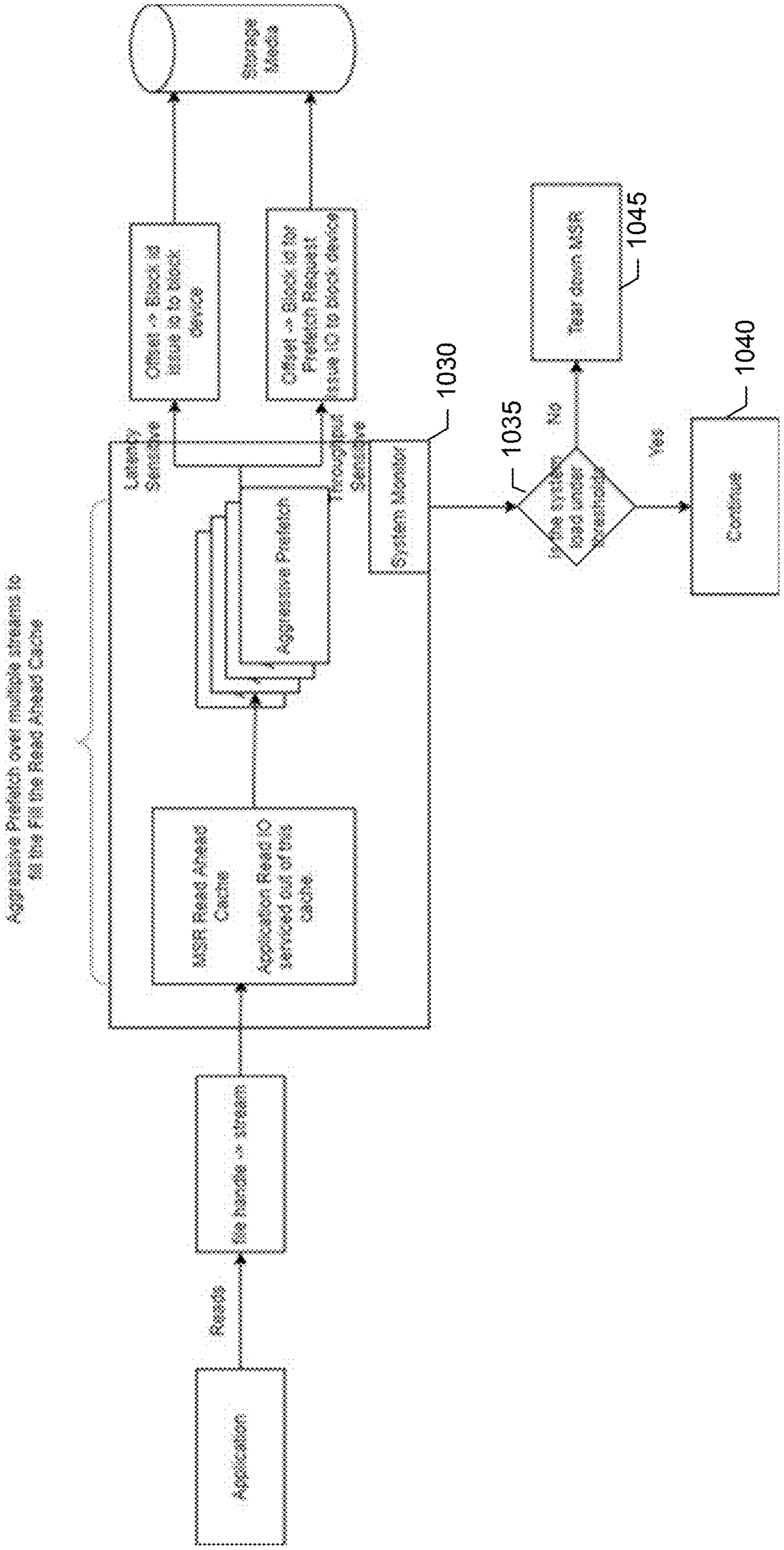
FIG. 10 shows another flow for MSR, according to one or more embodiments.

FIG. 10 shows another block diagram of an MSR flow where an MSR stream may be torn down due to system load. FIG. 10 is similar to FIG. 9. The example of FIG. 10, however, includes a system monitor 1030 that monitors or measures load.

In an embodiment, MSR is initialized for a restore stream provided certain conditions are met or satisfied. Such conditions may include satisfying a minimum file-size and satisfying requirements for a sequential access pattern. During MSR operation, it is possible that the access pattern changes from sequential to random, thus causing MSR to de-initialize and reads to fall back to the normal mode of operation. This is referred to as an MSR tear-down. Another reason for MSR to tear down would be when the system load increases. MSR continuously checks the system load while it is operational and tears down completely if the system load crosses a configurable threshold.

In an embodiment, each on-going restore job using an MSR stream periodically checks with the system monitor to inquire about system load and determine whether system load is under specified thresholds 1035. If the check reveals that system load is under the specified thresholds, the restore job continues with the MSR stream 1040. If, however, the check reveals that system load is not under the specified thresholds, the MSR stream is torn down 1045. The result of tearing down the MSR stream may result in a non-MSR stream being used to conduct the restoration. In other words, an MSR stream associated with restoration of a file may be replaced with a non-MSR stream for the restoration of the file. The non-MSR stream may include a single internal read thread that may or may not bypass the read-ahead cache.

In an embodiment, MSR is designed to be an opportunistic play or algorithm. It is transparent to the application, and based on heuristics kicks in or is triggered to help with the restore. The algorithm also monitors itself and gets out of the way (tears down), if it is not helping, or if the system is deemed too busy. While this method is protocol independent, it can also be beneficial to include application intelligence as a desirable input to the restore protocol. Not all restore requests are born equal, and it can be desirable for MSR to distinguish between requests. For example, in an embodiment, if there were one MSR stream available, MSR would pick up the first request that comes to MSR, provided the stream met all other criteria.

In another embodiment, systems and techniques are provided for application intelligence in connection with restorations of files to further facilitate efficient use of filesystem resources. In an embodiment, communications between the client-side data protection deduplication library and API server allows clients having the library to inform the filesystem about their intent to request MSR for a given restore stream. Table B below shows an example of API signatures to pin a file for an MSR stream (e.g., request restoration be conducted using an MSR stream) and, if desired, unpin a file from using the MSR stream (e.g., request that the MSR stream be torn down).

TABLE B

| |
|---|
| ddp_request_pin_msr (file_handle_t fh) |
| ddp_request_unpin_msr (file_handle_t fh) |

In the example shown in Table B above, the parameter "fh" is the file handle which identifies the file, and therefore the stream associated with the restore request. This API can be called at any time during the restore. For example, the API to pin a file for an MSR stream may be called at a beginning of a restore or while a restore is in-progress. Similarly, the API to unpin a file from MSR status may be called while the restore is in-progress.

As explained above, this is a hint to the filesystem, and the filesystem may or may not choose to accept it. The filesystem would however tag this stream as "MSR requested." Given the predicament, if an MSR stream has to be evicted, the stream without the "MSR requested" tag is preferred over the stream with "MSR requested" tag.

Thus, the client can provide an indication to the filesystem regarding conducting application restores and preferences. More particularly, the backup administrator user, and therefore the client backup application has control in determining the priority of a given restore job. In a case of a batch of restore jobs, the administrator can determine the order of restore, and the priority associated with each one of them.

For example, a restore job for a test/development environment can be treated at a lower priority when compared to a high priority request from the legal department in an organization. In this case, the administrator may withhold from pinning the restore job for testing/development for an MSR stream, but pin for an MSR stream the high priority restore request from the legal department. As discussed, at any time during a restoration, the client can pin a file for an MSR stream or unpin a file from an MSR stream. Consider, as an example, that restoration of a first file is being conducted using an MSR stream. While restoration of the first file is in progress, there is a need to restore a second file having higher priority than the first file. In this case, a request may be made to unpin the first file from the MSR stream and pin the second file for an MSR stream.

Unlike the backups, most high priority restore jobs are on-demand. To meet the requirements, administrators juggle the scheduled jobs out of the way, to create IO bandwidth for the "high priority" jobs. This manual juggling of scheduled jobs can be very time-consuming. In an embodiment, however, the restore priority is built into the system. A technique of the restore priority may be referred to as application-owned restore performance. In this embodiment, the client application can choose to leverage MSR performance for the most urgent jobs. In an embodiment, the application can issue a request to the filesystem for the current count of priority MSR streams. The filesystem maintains the priority MSR stream count and the total number of MSR stream count. Without any priority MSR streams, the filesystem is free to choose which stream gets the MSR advantage, till the total number of the MSR stream count reaches a threshold.

Figure 11:
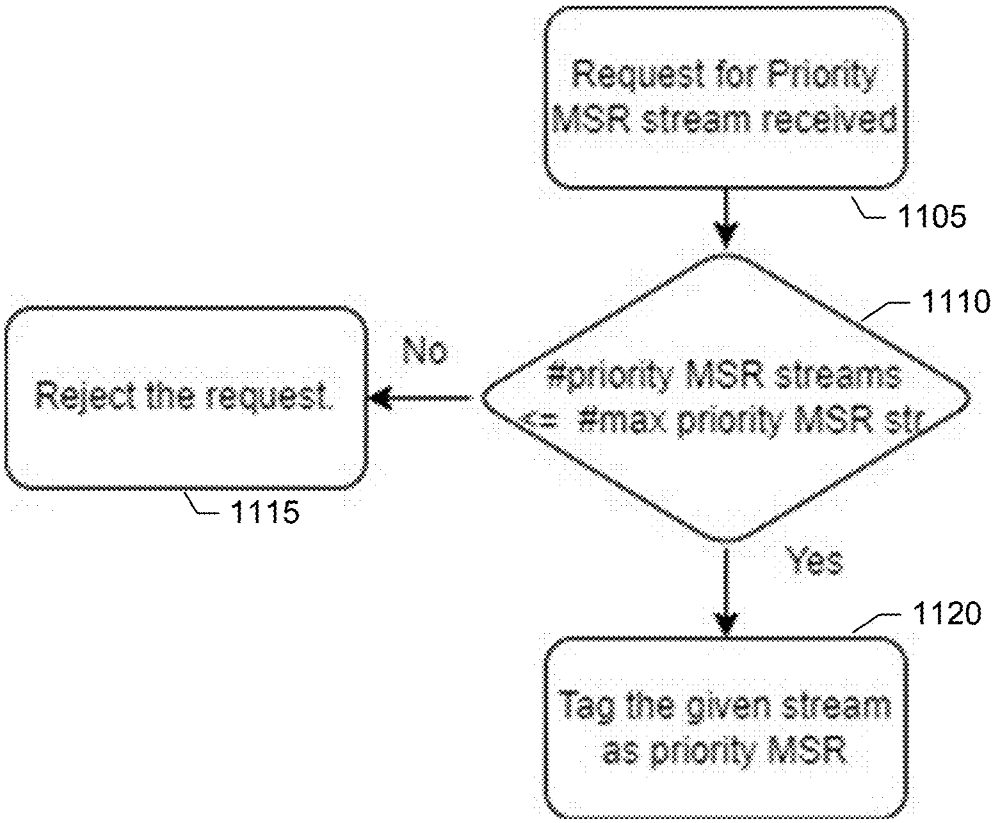
FIG. 11 shows a process for tagging a stream as a priority MSR, according to one or more embodiments.

FIG. 11 shows a flow for handling a restore job from a client in which there was a pin or specific request for an MSR stream. Once the filesystem receives the request for a "priority MSR stream" (step 1105), the filesystem checks if there is an available slot to serve the "priority MSR stream" (step 1110). If the total number of "priority MSR streams" is greater than or equal to the maximum number of MSR streams allowed, there is no room to grant MSR. Such a request is rejected (step 1115). If the total number of "priority MSR streams" is less than the maximum number of MSR streams allowed, the stream for the restoration is tagged as a priority MSR (step 1120).

There may be more than one backup client (e.g., multiple backup clients) which are using the same filesystem. If there were just one application using the filesystem, the application can keep track of the number of priority jobs. However, with multiple application instances, the filesystem can provide a central point of contact to keep track of the number of priority jobs that may be requested by each of the multiple different clients.

Figure 12:
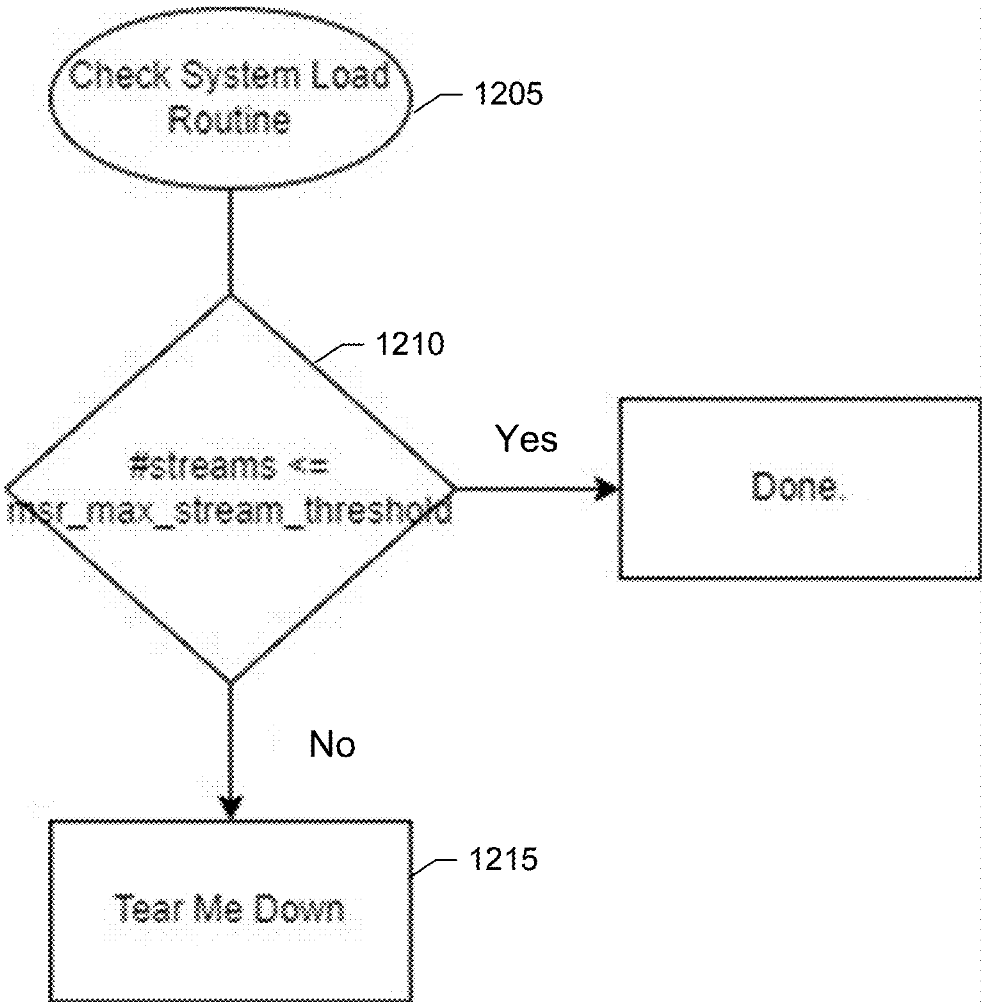
FIG. 12 shows a flow of a system load check routine, according to one or more embodiments.

In an embodiment, if there is not a slot for the "priority MSR stream" request, the MSR subsystem checks if it needs to evict a running MSR job. FIG. 12 shows an example of checking system load. In an embodiment, MSR has a system load check as part of each MSR job. In this embodiment, a "Check System Load" routine (1205) is called by the running MSR jobs. The MSR job periodically checks if the system load were within thresholds, and if it were, it would not tear itself down. Since the load checker is polling periodically, there is a certain degree of randomness as to what stream detects and tears down itself.

As shown in the example of FIG. 12, one of the elements or criteria of a system load check includes whether the number of streams in the system is less than the msr_max_stream_threshold (1210). The msr_max_stream_threshold is a count beyond which MSR would start tearing down (1215). For example, if each MSR stream were to consume four internal streams, each tear down closes four streams.

Figure 13:
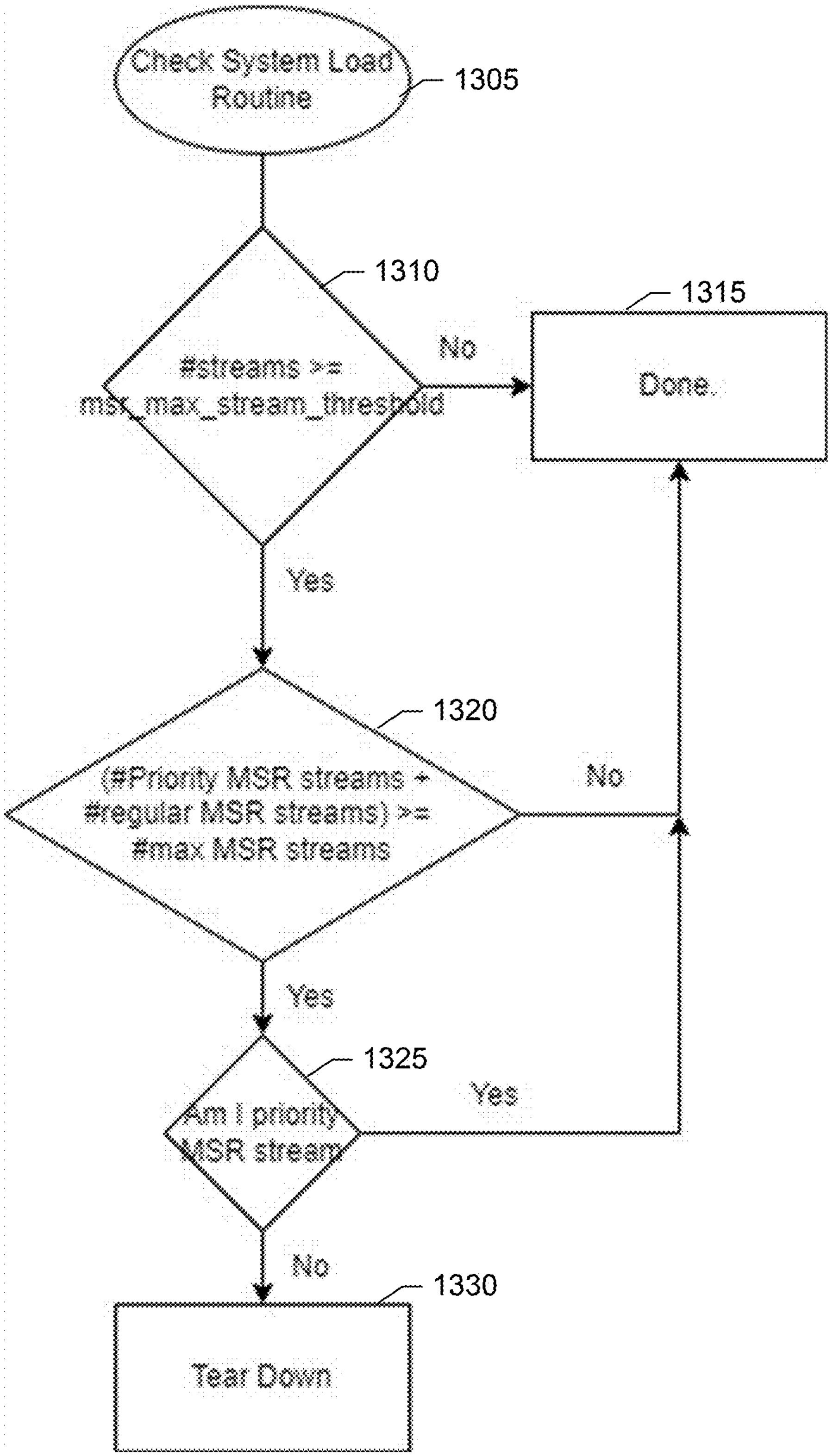
FIG. 13 shows another flow of a system load check routine, according to one or more embodiments.

FIG. 13 shows a flow for handling system load checks in connection with priority MSR streams. As shown in the example of FIG. 13, the filesystem counts the number of accepted priority MSR streams and the total number of regular (non-priority MSR streams). If this count is greater than the max MSR streams, and the current MSR context is non-priority, it must tear down to give priority to the priority MSR stream. In the system, there cannot be more than max MSR streams. Given that the non-priority MSR stream will tear itself down, the MSR kick in check would find the slot for the priority MSR stream, and therefore allow the desired effect. Once the stream is closed by the application, the priority MSR flag goes away, and the counts are decremented. Alternatively, if the unpin method is called, the counters are updated.

In an embodiment, a check system load routine 1305 determines whether the total number of MSR streams has reached the maximum number of MSR streams allowed (step 1310). If the total number of MSR streams has not reached the maximum number of MSR streams allowed, the check process exits (step 1315).

If, however, the total number of MSR streams has reached the maximum number of MSR streams allowed, the process continues to distinguish between priority MSR streams and regular or non-priority MSR streams. In an embodiment, priority MSR streams include MSR streams in which the client made a specific request for an MSR stream for a restoration job of a file.

Regular or non-priority MSR streams include MSR streams in which the client did not make a specific request for an MSR stream, but the filesystem elected to use an MSR stream for the restore job of a file because other criteria was satisfied. Such criteria may include one or more of system load being under a threshold, file access pattern determined to be sequential, size of file meeting minimum file size, or other criteria, and combinations of these.

Specifically, a determination is made as to whether the number of priority MSR streams plus the number of regular or non-priority MSR streams has reached the maximum number of MSR streams (step 1320). If the number of priority MSR streams plus the number of regular or non-priority MSR streams has not reached the maximum number of MSR streams, the process exits (step 1315).

If the number of priority MSR streams plus the number of regular or non-priority MSR streams has reached the maximum number of MSR streams, the instant MSR stream checks as to whether it is a priority stream (1325). If the instant MSR stream is a priority stream, the process exits (step 1315). That is, the corresponding restore job of the file continues with using the MSR stream for the restore.

If the instant MSR stream is not a priority MSR stream, however, the instant MSR streams tears down (step 1330) so as to open up a slot for a priority MSR stream. Systems and techniques provide client-informed multi stream restore to enable preferred restore throughput in a deduplication filesystem.

In an embodiment, a method may include: conducting a plurality of concurrent file restorations, each restoration of a respective file comprising multiple internal read-ahead streams that read ahead data of the respective file and populate the data into a read-ahead cache; while the plurality of concurrent file restorations are in-progress, receiving a request from a client to designate a particular file to be restored as a high-priority restore; checking system load to determine whether the particular file can be restored using multiple internal read-ahead streams, the checking system load comprising: determining whether a number of the multiple internal read-ahead streams has reached a threshold; if the number of the multiple internal read-ahead streams has not reached the threshold, establishing multiple read-ahead streams for restoration of the particular file; if the number of the multiple internal read-ahead streams has reached the threshold, determining whether a file being restored via the multiple internal read-ahead streams has not been designated as a high-priority restore; if the file being restored via the multiple internal read-ahead streams has not been designated as a high-priority restore, tearing down the multiple internal read-ahead streams associated with the file to allow the particular file to be restored via the multiple internal read-ahead streams; and if the file being restored via the multiple internal read-ahead streams has been designated as a high-priority restore, maintaining the multiple internal read-ahead streams for the file and checking whether a next file being restored via the multiple internal read-ahead streams has not been designated as a high-priority restore.

Figure 14:
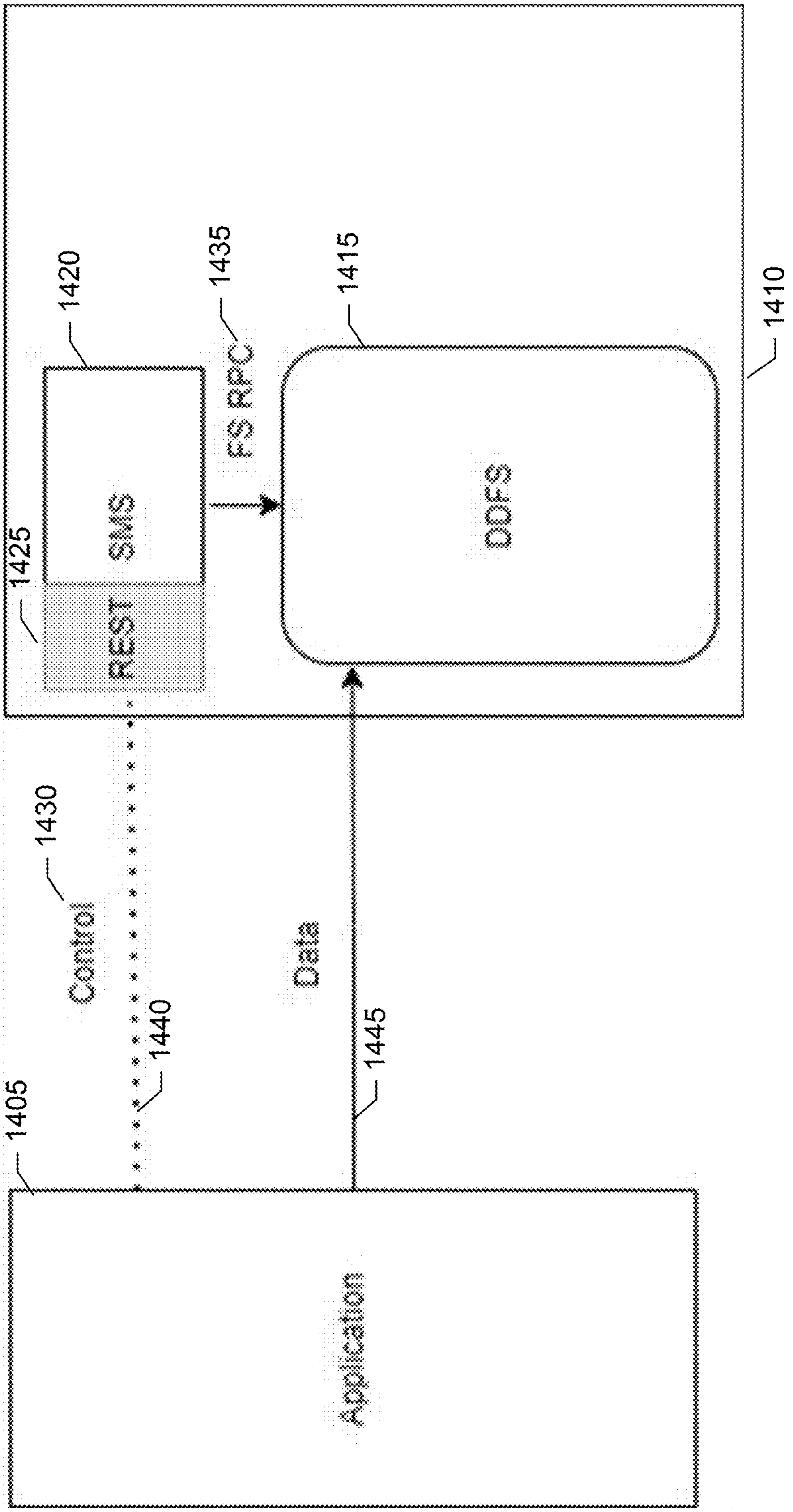
FIG. 14 shows a block diagram of a REST architecture, according to one or more embodiments.

FIG. 14 shows a block diagram for client-informed MSR via a REST protocol. As discussed, an embodiment of the client-informed MSR technique relies on a client-side deduplication library that communicates with the filesystem via to pin and unpin the MSR status on a given stream. The APIs are constructed with the assumption that the client-side deduplication library will be used to communicate to the filesystem.

In another embodiment, however, the APIs are implemented via the REST protocol. That makes it a control path operation which can be used by any application that uses any or a different data protocol other than that used by the client-side deduplication library. In particular, the example shown in FIG. 14 includes a client application 1405 connected via a network to a data protection appliance 1410 having a deduplicated filesystem 1415. The data protection appliance includes a system management service (SMS) 1420 having a REST server 1425. In an embodiment, an MSR control REST request 1430 is initiated from the application (client) and terminates at the REST server within the System Management Service (SMS). The REST endpoint, in-turn, issues a request to the filesystem using internal RPCs 1435. The filesystem, on receiving the request, acts in accordance. As shown in the example of FIG. 14, restoration of a file includes a control path 1440 between the client application and filesystem and a data path 1445 between the client application and filesystem.

Table C below shows an example of the REST API.

TABLE C

| |
|---|
| https://datadomain.com:3009/api/v1/streams/<stream_id>/attributess/pin |

In an embodiment, a GET on this request retrieves the status of the stream indicating whether the stream is currently pinned or unpinned. A POST request enables pinning for the stream. A DELETE request unpins the stream. Given that the above APIs are control path operations, and MSR is protocol-agnostic, the above approach extends the client-informed MSR technique to be application-agnostic.

In an embodiment, a method includes: establishing multiple internal read-ahead streams for each of a plurality of current restore streams handling restorations of files managed by a deduplication system; receiving an application programming interface (API) signature from a client, the API signature comprising an identification of a file to restore and a request to pin the file as priority; tagging a restore stream for the file as priority requested; and determining whether to establish the multiple internal read-ahead streams for the restore stream, the determining comprising: when a threshold number of the plurality of current restore streams using the multiple internal read-ahead streams has been reached, checking whether a current restore stream using the multiple internal read-ahead streams has the priority requested tag; and when the current restore stream using the multiple internal read-ahead streams does not have the priority requested tag, tearing down the multiple internal read-ahead streams of the current restore stream to allow the multiple internal read-ahead streams to be established for the restore stream having the priority requested tag.

The determining may further include: when the current restore stream using the multiple internal read-ahead streams does have the priority requested tag, maintaining the multiple internal read-ahead streams for the current restore stream. In an embodiment, the method includes after the maintaining, checking whether a next current restore stream using the multiple internal read-ahead streams has the priority requested tag.

The method may further include: after the tearing down, establishing the multiple internal read-ahead streams for the restore stream having the priority requested tag; while the file is being restored using the multiple internal read-ahead streams, receiving a second API signature from the client, the second API signature comprising the identification of the file and a request to unpin the file from priority; and in response to the request to unpin the file, tearing down the multiple internal read-ahead streams for the restore stream of the file.

The determining may further include: when the threshold number of the plurality of current restore streams using the multiple internal read-ahead streams has not been reached, establishing the multiple internal read-ahead streams for the restore stream having the priority requested tag. In an embodiment, the method further includes: after the tearing down the multiple internal read-ahead streams of the current restore stream, using a single read stream to continue restoration of a file associated with the current restore stream.

In another embodiment, there is a system comprising: a processor; and memory configured to store one or more sequences of instructions which, when executed by the processor, cause the processor to carry out the steps of: establishing multiple internal read-ahead streams for each of a plurality of current restore streams handling restorations of files managed by a deduplication system; receiving an application programming interface (API) signature from a client, the API signature comprising an identification of a file to restore and a request to pin the file as priority; tagging a restore stream for the file as priority requested; and determining whether to establish the multiple internal read-ahead streams for the restore stream, the determining comprising: when a threshold number of the plurality of current restore streams using the multiple internal read-ahead streams has been reached, checking whether a current restore stream using the multiple internal read-ahead streams has the priority requested tag; and when the current restore stream using the multiple internal read-ahead streams does not have the priority requested tag, tearing down the multiple internal read-ahead streams of the current restore stream to allow the multiple internal read-ahead streams to be established for the restore stream having the priority requested tag.

In another embodiment, there is a computer program product, comprising a non-transitory computer-readable medium having a computer-readable program code embodied therein, the computer-readable program code adapted to be executed by one or more processors to implement a method comprising: establishing multiple internal read-ahead streams for each of a plurality of current restore streams handling restorations of files managed by a deduplication system; receiving an application programming interface (API) signature from a client, the API signature comprising an identification of a file to restore and a request to pin the file as priority; tagging a restore stream for the file as priority requested; and determining whether to establish the multiple internal read-ahead streams for the restore stream, the determining comprising: when a threshold number of the plurality of current restore streams using the multiple internal read-ahead streams has been reached, checking whether a current restore stream using the multiple internal read-ahead streams has the priority requested tag; and when the current restore stream using the multiple internal read-ahead streams does not have the priority requested tag, tearing down the multiple internal read-ahead streams of the current restore stream to allow the multiple internal read-ahead streams to be established for the restore stream having the priority requested tag.

In an embodiment, a method includes: tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for the restore jobs into read-ahead caches; receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down an MSR stream associated with a restore job not pinned for the MSR stream to give priority to the restore job requesting the MSR stream.

The method may further include: after the tearing down the MSR stream, starting the restore job requesting the MSR stream; while the restore job is in progress, receiving a second REST request for the restore job, the second REST request requesting that the restore job be unpinned from the MSR stream; and in response to receiving the second REST request to unpin the restore job from the MSR stream, tearing down the MSR stream for the restore job.

The method may further include: after the tearing down an MSR stream associated with a restore job not pinned for the MSR stream, opening a single read stream to continue the restoration job not pinned for the MSR stream. In an embodiment, the REST request comprises a POST request.

The method may further include: receiving a second REST request comprising a GET request identifying a particular restore job and requesting a status of a stream associated with the particular restore job; and responding to the second REST request with a message indicating that the stream is currently pinned for the MSR stream or unpinned from the MSR stream. In an embodiment, the REST request is received by a storage appliance comprising a deduplication filesystem storing files corresponding to the restore jobs.

In an embodiment, there is a system comprising: a processor; and memory configured to store one or more sequences of instructions which, when executed by the processor, cause the processor to carry out the steps of: tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for the restore jobs into read-ahead caches; receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down an MSR stream associated with a restore job not pinned for the MSR stream to give priority to the restore job requesting the MSR stream.

In another embodiment, there is a computer program product, comprising a non-transitory computer-readable medium having a computer-readable program code embodied therein, the computer-readable program code adapted to be executed by one or more processors to implement a method comprising: tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for the restore jobs into read-ahead caches; receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down an MSR stream associated with a restore job not pinned for the MSR stream to give priority to the restore job requesting the MSR stream.

In another embodiment, a method may include: receiving an application programming interface (API) signature comprising an identification of a file to restore and a request to conduct the restoration as a multi-stream restore (MSR), the MSR comprising establishing multiple internal threads that prefetch data of the file into a read-ahead cache; tagging a restore stream for the file as MSR requested; and determining whether the restore stream can be conducted using MSR, the determining comprising: when a threshold number of current restore streams allowed to be conducted using MSR has been reached, determining whether any of the current restore streams not having an MSR requested tag are being conducted using MSR; and when there is a current restore stream not having the MSR requested tag being conducted using MSR, tearing down the current restore stream being conducted using MSR to give priority to the restore stream having the MSR requested tag.

In another embodiment, a method may include: tracking a count of multi-stream restore (MSR) streams associated with restore jobs in which MSR was requested and a count of MSR streams associated with restore jobs in which MSR was not requested, each MSR stream comprising multiple internal threads that prefetch data for the restore jobs into a read-ahead cache; receiving a representational state transfer (REST) request for a restore job, the REST request including a parameter requesting MSR for the restore job; and when the count of MSR streams associated with restore jobs in which MSR was requested plus the count of MSR streams associated with restore jobs in which MSR was not requested has reached a threshold, tearing down an MSR stream associated with a restore job in which MSR was not requested to give priority to the REST request for the restore job having the parameter requesting MSR.

Figure 15:
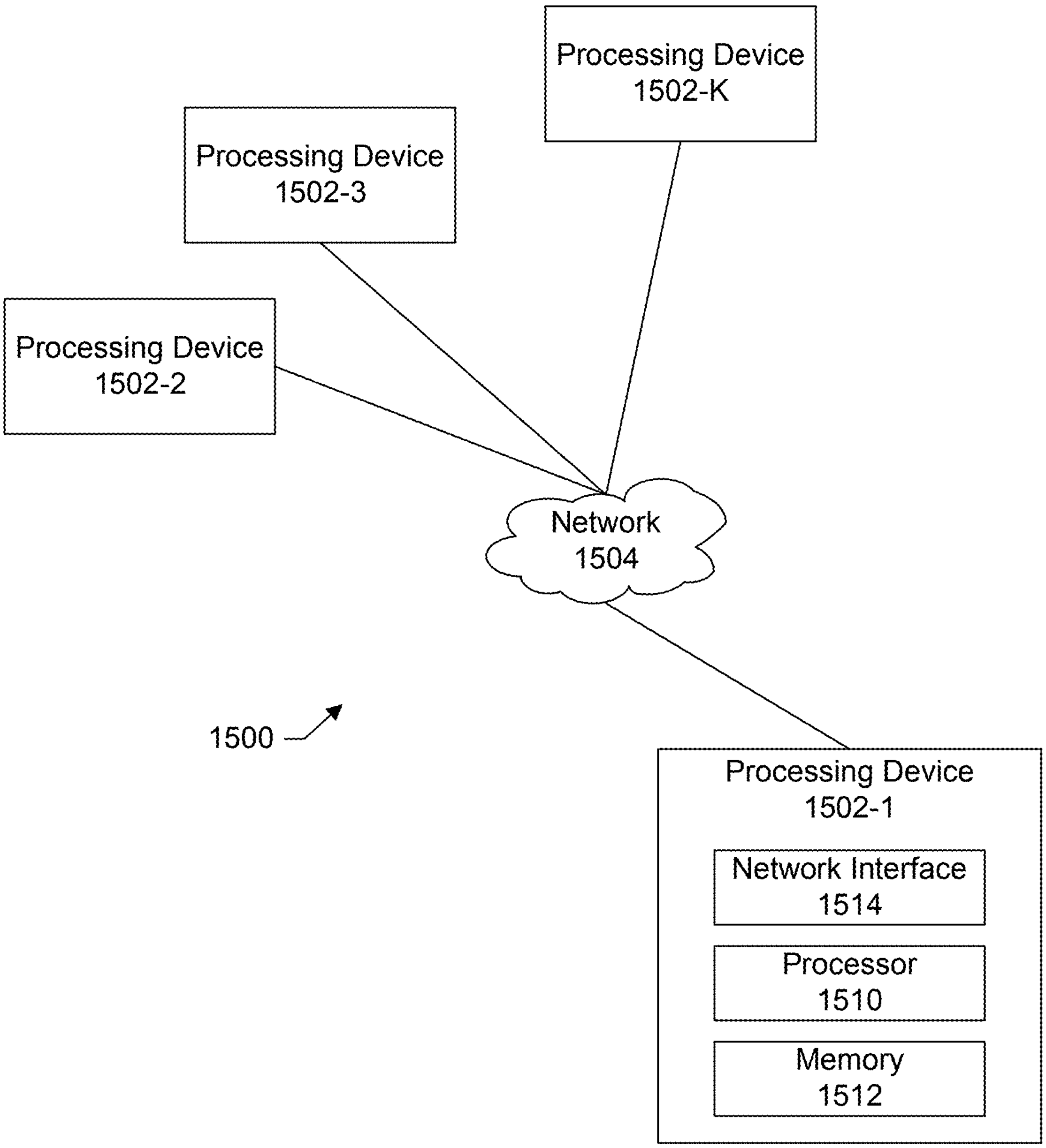
FIG. 15 shows a block diagram of a processing platform that may be utilized to implement at least a portion of an information processing system, according to one or more embodiments.

FIG. 15 shows an example of a processing platform 1500 that may include at least a portion of the information handling system shown in FIG. 1. The example shown in FIG. 15 includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA) or other type of processing circuitry, as well as portions or combinations of such circuitry elements.

The memory 1512 may comprise random access memory (RAM), read-only memory (ROM) or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 16:
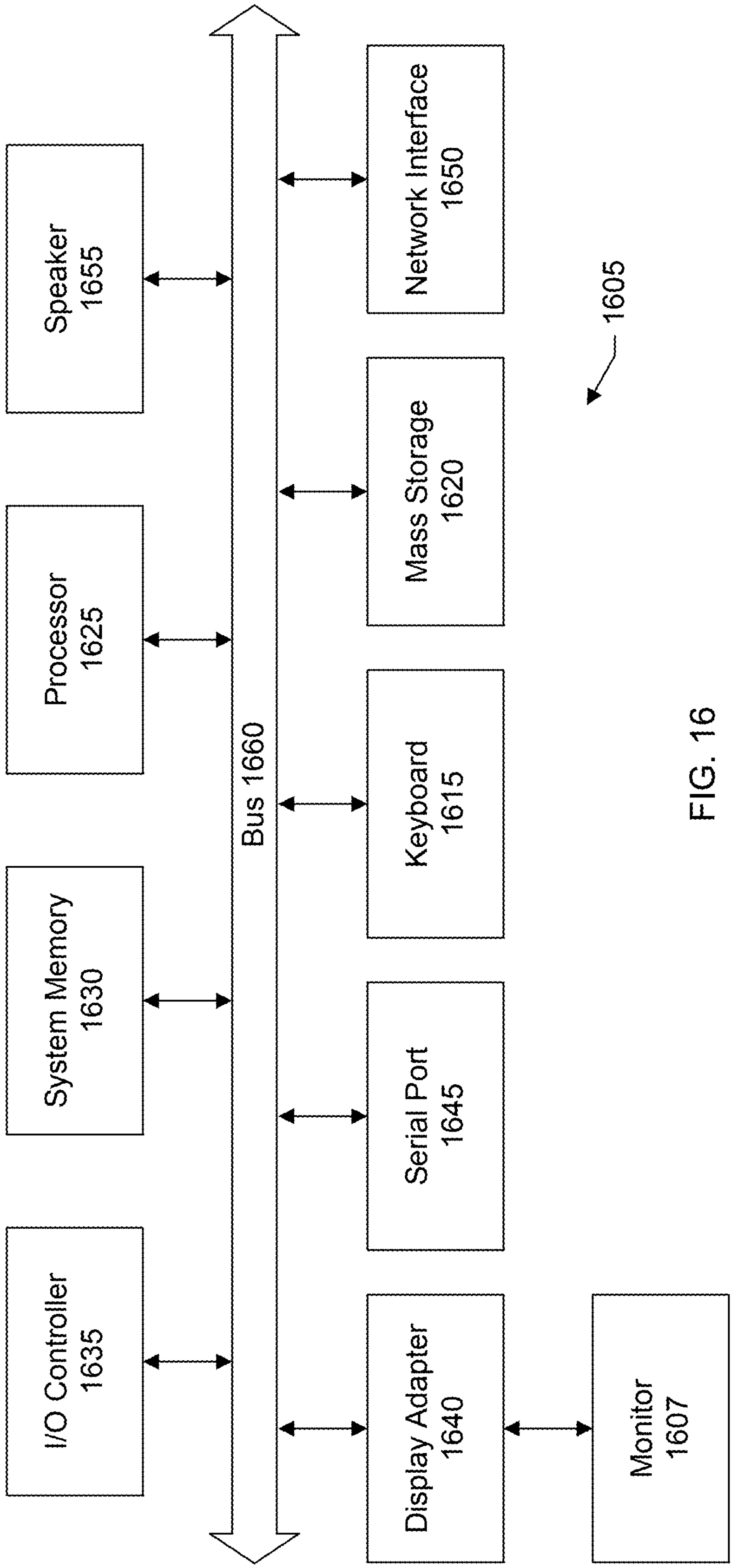
FIG. 16 shows a block diagram of a computer system suitable for use with the system, according to one or more embodiments.

FIG. 16 shows a system block diagram of a computer system 1605 used to execute the software of the present system described herein. The computer system includes a monitor 1607, keyboard 1615, and mass storage devices 1620. Computer system 1605 further includes subsystems such as central processor 1625, system memory 1630, input/output (I/O) controller 1635, display adapter 1640, serial or universal serial bus (USB) port 1645, network interface 1650, and speaker 1655. The system may also be used with computer systems with additional or fewer subsystems. For example, a computer system could include more than one processor 1625 (i.e., a multiprocessor system) or a system may include a cache memory.

Arrows such as 1660 represent the system bus architecture of computer system 1605. However, these arrows are illustrative of any interconnection scheme serving to link the subsystems. For example, speaker 1655 could be connected to the other subsystems through a port or have an internal direct connection to central processor 1625. The processor may include multiple processors or a multicore processor, which may permit parallel processing of information. Computer system 1605 shown in FIG. 16 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for all restore jobs into read-ahead caches;

receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down a particular MSR stream associated with a restore job not pinned for the MSR stream to give priority to the restore job requesting the MSR stream.

2. The method of claim 1 further comprising:

after the tearing down the particular MSR stream, starting the restore job requesting the MSR stream;

while the restore job is in progress, receiving a second REST request for the restore job, the second REST request requesting that the restore job be unpinned from the MSR stream; and in response to receiving the second REST request to unpin the restore job from the MSR stream, tearing down the MSR stream for the restore job.

3. The method of claim 1 further comprising:

after the tearing down the particular MSR stream associated with a restore job not pinned for the MSR stream, opening a single read stream to continue the restore job not pinned for the MSR stream.

4. The method of claim 1 wherein the REST request comprises a POST request.

5. The method of claim 1 further comprising:

receiving a second REST request comprising a GET request identifying a particular restore job and requesting a status of a stream associated with the particular restore job; and responding to the second REST request with a message indicating that the stream is currently pinned for the MSR stream or unpinned from the MSR stream.

6. The method of claim 1 wherein the REST request is received by a storage appliance comprising a deduplication filesystem storing files corresponding to all restore jobs.

7. A system comprising: a processor; and memory configured to store one or more sequences of instructions which, when executed by the processor, cause the processor to carry out the steps of:

tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for all restore jobs into read-ahead caches;

receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down a particular MSR stream associated with a restore job not pinned for the MSR stream to give priority to the restore job requesting the MSR stream.

8. The system of claim 7 wherein the processor further carries out the steps of:

after the tearing down the particular MSR stream, starting the restore job requesting the MSR stream;

while the restore job is in progress, receiving a second REST request for the restore job, the second REST request requesting that the restore job be unpinned from the MSR stream; and in response to receiving the second REST request to unpin the restore job from the MSR stream, tearing down the MSR stream for the restore job.

9. The system of claim 7 wherein the processor further carries out the steps of:

after the tearing down the particular MSR stream associated with a restore job not pinned for the MSR stream, opening a single read stream to continue the restore job not pinned for the MSR stream.

10. The system of claim 7 wherein the REST request comprises a POST request.

11. The system of claim 7 wherein the processor further carries out the steps of:

receiving a second REST request comprising a GET request identifying a particular restore job and requesting a status of a stream associated with the particular restore job; and responding to the second REST request with a message indicating that the stream is currently pinned for the MSR stream or unpinned from the MSR stream.

12. The system of claim 7 wherein the REST request is received by a storage appliance comprising a deduplication filesystem storing files corresponding to all restore jobs.

13. A computer program product, comprising a non-transitory computer-readable medium having a computer-readable program code embodied therein, the computer-readable program code adapted to be executed by one or more processors to implement a method comprising:

tracking a count of multi-stream restore (MSR) streams associated with restore jobs pinned for the MSR streams and a count of MSR streams associated with restore jobs not pinned for the MSR streams, each MSR stream comprising multiple internal threads that prefetch data for all restore jobs into read-ahead caches;

receiving a representational state transfer (REST) request for a restore job, the REST request requesting that the restore job be pinned for an MSR stream; and when the count of MSR streams associated with restore jobs pinned for the MSR streams plus the count of MSR streams associated with restore jobs not pinned for MSR streams has reached a threshold, tearing down a particular MSR stream associated with a restore job not pinned for the MSR stream to give priority to the restore job requesting the MSR stream.

14. The computer program product of claim 13 wherein the method further comprises:

after the tearing down the particular MSR stream, starting the restore job requesting the MSR stream;

while the restore job is in progress, receiving a second REST request for the restore job, the second REST request requesting that the restore job be unpinned from the MSR stream; and in response to receiving the second REST request to unpin the restore job from the MSR stream, tearing down the MSR stream for the restore job.

15. The computer program product of claim 13 wherein the method further comprises:

after the tearing down the particular MSR stream associated with a restore job not pinned for the MSR stream, opening a single read stream to continue the restore job not pinned for the MSR stream.

16. The computer program product of claim 13 wherein the REST request comprises a POST request.

17. The computer program product of claim 13 wherein the method further comprises:

receiving a second REST request comprising a GET request identifying a particular restore job and requesting a status of a stream associated with the particular restore job; and responding to the second REST request with a message indicating that the stream is currently pinned for the MSR stream or unpinned from the MSR stream.

18. The computer program product of claim 13 wherein the REST request is received by a storage appliance comprising a deduplication filesystem storing files corresponding to all restore jobs.

* * * * *